United States Patent Office 3,692,652
Patented Sept. 19, 1972

3,692,652
PHOTOSYNTHESIS OF KETONES FROM ORGANO-MERCURY COMPOUNDS AND CARBON MONOXIDE
Dietmar Seyferth, Lexington, Mass., and Ralph J. Spohn, Scotch Plains, N.J., assignors to Massachusetts Institute of Technology, Cambridge, Mass.
No Drawing. Filed Oct. 19, 1970, Ser. No. 82,178
Int. Cl. B01j 1/10
U.S. Cl. 204—158 R 6 Claims

ABSTRACT OF THE DISCLOSURE

Diarylmercury compounds in THF solutions react with carbon monoxide in the presence of dicobalt octacarbonyl and ultraviolet light to produce diaryl ketones.

---

The invention herein described was made in the course of work performed under a contract with the Department of the Army, and under a grant or award from the Department of Health, Education, and Welfare. The invention relates to the manufacture of diaryl ketones and provides a method for producing diaryl ketones in high yields.

One of the best known diaryl ketones is benzophenone. This substance has found extensive use as a fixative for perfumes.

It has been known that diaryl ketones may be synthesized by reacting diarylmercury or an arylmercuric halide with stoichiometric quantities of dicobalt octacarbonyl, producing as other products carbon monoxide and $$Hg[Co(CO)_4]_2$$

A catalytic process would, in principle be possible if the latter could be converted to the active $Co_2(CO)_8$ again.

(I) 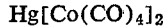
$$R_2Hg \xrightarrow{Co_2(CO)_8} R_2C=O + Hg[Co(CO)_4]_2 + CO$$

[D. Seyferth and R. J. Spohn, J. Am. Chem. Soc., 91, 3037 (1969); 90, 540 (1968).]

It has been reported that $Hg[Co(CO)_4]_2$ reacts with acetylenes in the presence of ultraviolet light in a reaction described as involving the intermediate release of dicobalt octacarbonyl. e.g., Equation II.

(II) 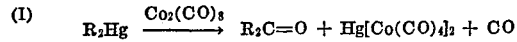

$$HC\equiv CH + Hg[Co(CO)_4]_2 \xrightarrow[\text{U.V. or heat}]{\text{Petrol. Ether}} \underset{\underset{(OC)_3}{Co}\quad Co(CO)_3}{\overset{H\quad H}{\underset{C=C}{\diagdown\;\diagup}}} + Hg + 2CO$$

These workers also showed that at an elevated temperature the mercury biscobalttetracarbonyl would decompose to dicobalt octacarbonyl.

(a) G. Peyronel, A. Ragni and E. F. Trogu, Gazz. Chim. Ital., 92, 738 (1962);

(b) A. Ragni, E. F. Trogu and G. Peyronel, ibid., 96, 1609 (1966);

(c) G. Peyronel, A. Ragni and E. F. Trogu, ibid., 97, 1327 (1967);

(d) A. Ragni, G. Peyronel and E. F. Trogu, Atti. Soc. Nat. Mat. Modena, 94, 1 (1963); Chem. Abstr. 63, 6891 (1965).

We have now found that diarylmercury compounds and CO will react directly to produce diaryl ketones in the presence of catalytic quantities of $Co_2(CO)_8$ or $Hg[Co(CO)_4]_2$ while the reaction components are irradiated with ultraviolet light. The $Hg[Co(CO)_4]_2$ which is formed in reaction I thus is continuously re-converted to $Co_2(CO)_8$. To those skilled in the art we would reasonably expect that this reaction could be carried out under elevated carbon monoxide pressures and at elevated temperatures not unlike conventional "oxo" or other carbonylation processes now practiced in industry.

The overall reaction is:

(III) 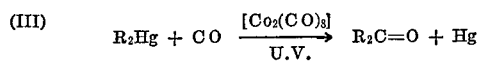
$$R_2Hg + CO \xrightarrow[U.V.]{[Co_2(CO)_8]} R_2C=O + Hg$$

The chief advantage of reaction III over reaction I is that reaction III utilizes $Co_2(CO)_8$ as a catalyst and so only small amounts of this expensive substance are needed. In this equation it is believed R may be either an unsubstituted or substituted aryl. But with heavily halogenated diaryls as where R is $C_6X_5$ or $C_6HX_4$ and where X is a halogen group—or where R has two groups substituted in ortho position, the process is believed not to work.

The ease of preparing these ketones is emphasized by several factors: the reaction proceeds at moderate temperatures and can employ atmospheric pressure, mild reaction conditions; easily accessible starting materials may be used; a simple non-hydrolytic work-up can be effected; the metallic mercury product is easily recycled and isolation of the ketone product is easily achieved. Still another diaryl ketone synthesis is that of Heck. [R. F. Heck, J. Amer. Chem. Soc., 90, 5546 (1968).]

Using various Pd (II) catalysts and various Rh (III) catalysts, Heck synthesized diaryl ketones from arylmercuric chlorides and CO. (Occasionally, other arylating agents such as $(C_6H_5)_4Pb$ were used in place of arylmercuric chlorides.) The yields of diaryl ketones produced by the Heck synthesis are clearly not as high as those of the present synthesis, which is also distinguishable from Heck's by the use of diarylmercurials as reactants and dicobalt octacarbonyl as a catalyst.

Several examples of preferred embodiments of the invention are now given to better illustrate this invention, and the first example is given in great detail with the general procedure applicable to all the examples.

EXAMPLE 1

This example illustrates the preparation of benzophenone. A 150 ml. 1-necked quartz flask containing a stir bar is fitted with an Alihn condenser. A solvent-resistant ⅛-inch plastic tube is inserted through the condenser to within one inch of the flask and connected to a carbon monoxide tank. The flask is charged with 10.0 g. of diphenylmercury and 100 ml. of dry THF. The system is flushed with carbon monoxide, and 0.50 g. of $Co_2(CO)_8$ is added. The reaction mixture is stirred with a magnetic stirrer, and carbon monoxide is continually and slowly passed through. At the same time, throughout the reaction period, the flask is irradiated externally with a Hanovia utility (100-watt high pressure) ultraviolet lamp. A closely-placed fan provides cooling. The progress of the reaction is monitored by thin-layer chromatography. [D. Seyferth and J. M. Burlitch, J. Organometal. Chem., 4, 127 1965).] The flow of carbon monoxide is stopped after about 123 hours at room temperature after thin-layer chromatography shows that the diphenylmercury has been consumed. The reaction mixture is next flushed with nitrogen to remove CO and decanted from 5.40 g. (95 percent) of metallic mercury. Further work-up of the filtrate followed a previous procedure. [D. Seyferth and R. J. Spohn, J. Amer. Chem. Soc., 90, 540 (1968); 91, 3037 (1969).] Thus, tetrahydrofuran was removed at reduced pressure by means of a rotary evaporator, and the residue was extracted with 100 ml. of hot benzene. To the red-orange benzene solution was added an excess of triphenylphosphine (3.8 mmoles) or 0.997 gram. In this manner the known great insolubility of $Hg[Co(CO)_3PPh_3]_2$ was utilized to separate any $Hg[Co(CO)_4]_2$ formed. One milliliter of methyl iodide was added to precipitate unconverted triphenylphosphine as $Ph_3MeP^+I^-$. Filtration by means of a suction filter left a solution containing methyl iodide and the ketone produced. The final benzene solution was evaporated using a rotary evaporator and the residue crystallized to give 4.7 grams (91 percent yield) of benzophenone, melting point 45°–47° C., whose infrared spectrum was identical to that of an authentic sample. While $Co_2(CO)_8$ is the actual catalyst and may be used to start the reaction, it is more convenient to use the stable and more easily handled $Hg[Co(CO)_4]_2$ as the initially-charged catalyst. In a reaction where this was done, the $Ar_2Hg$ to $Hg[Co(CO)_4]_2$ molar ratio equaled 94; and a 141-hour reaction time gave an 88 percent yield of benzophenone.

EXAMPLE 2

The basic process of Example 1 was followed with the exception that we used benzene as the solvent and benzophenone was formed in 65 percent yield.

EXAMPLE 3

The basic process of Example 1 was followed with the exception that we used methanol as the solvent. Benzophenone was formed in 40 percent yield and benzopinacol was formed in 22 percent yield.

EXAMPLE 4

The basic process of Example 1 was followed with the exception that we used 8.50 g. (27.0 mmoles) of di-n-butyl-mercury and produced di-n-butyl ketone and n-butyl-sec-butyl ketone in an overall 22 percent yield.

Other arylmercurial groups contemplated for use in the practice of this invention are:

(o-MeC$_6$H$_4$)$_2$Hg          (1-methylnaphthyl)$_2$Hg
(C$_6$H$_5$CH$_2$)$_2$Hg          (thienyl)$_2$Hg
(naphthyl)$_2$Hg          (4-pyridyl)$_2$Hg
(phenanthryl)$_2$Hg          (furanyl)$_2$Hg
(anthryl)$_2$Hg and others.

Having now described and given examples of this most extraordinary and novel new synthesis of diaryl ketones, we proceed to claim the following:

1. A process for forming a ketone of the formula:

$$R_2C=O$$

wherein R is selected from the group consisting of aryl, alkyl, and heterocyclic which comprises reacting in an inert solvent carbon monoxide and an organomercury compound of the formula:

$$R_2Hg$$

under ultraviolet light in the presence of a catalyst selected from the group consisting of dicobalt octacarbonyl and mercury biscobalttetracarbonyl.

2. The process according to claim 1 wherein said catalyst is dicobalt octacarbonyl.

3. The process according to claim 1 wherein said catalyst is mercury biscobalttetracarbonyl.

4. The process according to claim 1 wherein said organomercury compound is a diarylmercury compound.

TABLE I.—COBALT CARBONYL-CATALYZED CARBONYLATION OF DIARYLMERCURY COMPOUNDS

| Ar in Ar$_2$Hg | Catalyst | Ar$_2$Hg catalyst molar ratio | Reaction time (hours) | Product (percent yield) | Mercury (percent yield) |
|---|---|---|---|---|---|
| Ph | Hg[Co(CO)$_4$]$_2$ | 94 | 141 | Ph$_2$C=O(88) | 99 |
| Ph | Hg[Co(CO)$_4$]$_2$ | 470 | [1] 21 | Ph$_2$C=O(74) | 100 |
| p-FC$_6$H$_4$ | Co$_2$(CO)$_8$ | 46 | 120 | (p-FC$_6$H$_4$)$_2$C=O(87) | 97 |
| p-ClC$_6$H$_4$ | Co$_2$(CO)$_8$ | 22.4 | 233 | (p-ClC$_6$H$_4$)$_2$C=O(85) | 78 |
| p-CH$_3$C$_6$H$_4$ | Hg[Co(CO)$_4$]$_2$ | 88 | 36.5 | (p-CH$_3$C$_6$H$_4$)$_2$C=O(62) | 98 |
| p-CH$_3$OC$_6$H$_4$ | Hg[Co(CO)$_4$]$_2$ | 48 | 133 | (p-CH$_3$C$_6$H$_4$)$_2$C=O(52) | 98 |

[1] Days.

Table II illustrates some further examples of the basic method of Example 1, but now the reaction temperature is 55° C.

TABLE II.—CARBONYLATION OF MERCURIALS
[Ar$_2$Hg/Hg[Co(CO)$_4$]$_2$=94; t=~55° C.]

| Ar$_2$Hg | Reaction time, hours | Ketone, percent | Hg, percent |
|---|---|---|---|
| Ph | 45.5 | 65 | 99 |
| p-FC$_6$H$_4$ | 48 | 68 | 100 |
| p-MeOC$_6$H$_4$ | 48 | 64 | 99 |
| p-MeC$_6$H$_4$ | 36.5 | 62 | 92 |
| p-ClC$_6$H$_4$ | 68 | 59 | 89 |

5. The process according to claim 1 wherein said organomercury compound is a dialkylmercury compound.

6. The process according to claim 1 wherein said solvent is tetrahydrofuran.

References Cited

Seyferth et al.: 91, J. Am. Chem. Soc., 3037 (1969).
Seyferth et al.: 90, J. Am. Chem. Soc., 540 (1968).
Heck: 90, J. Am. Chem. Soc., 5546 (1968).

HOWARD S. WILLIAMS, Primary Examiner